April 28, 1970   R. A. PRATT   3,508,762
CONTAINER CHASSIS

Filed March 22, 1968   3 Sheets-Sheet 1

*INVENTOR*
ROBERT A. PRATT

BY *Kenneth C. Witt*

ATTORNEY

April 28, 1970   R. A. PRATT   3,508,762
CONTAINER CHASSIS

Filed March 22, 1968   3 Sheets-Sheet 2

INVENTOR
ROBERT A. PRATT
BY Kenneth C. Witt
ATTORNEY

April 28, 1970  R. A. PRATT  3,508,762
CONTAINER CHASSIS
Filed March 22, 1968  3 Sheets-Sheet 3
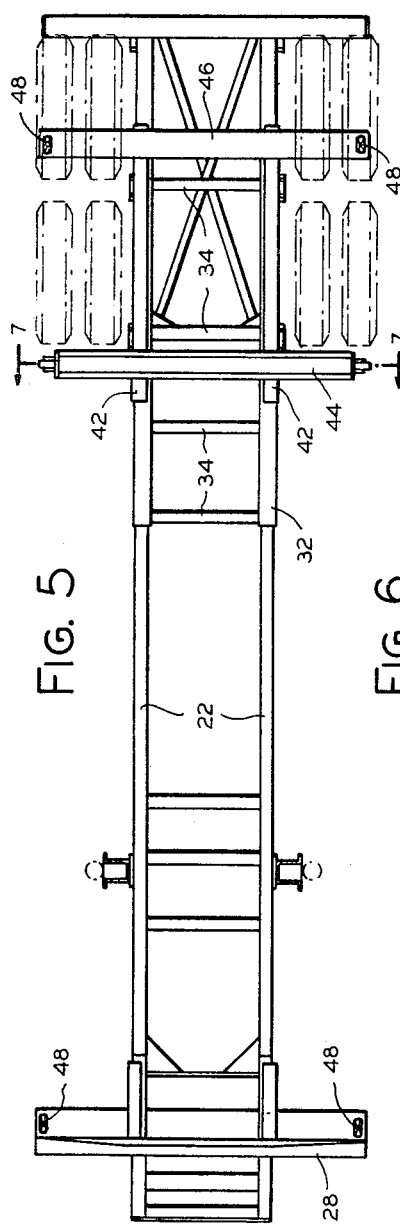
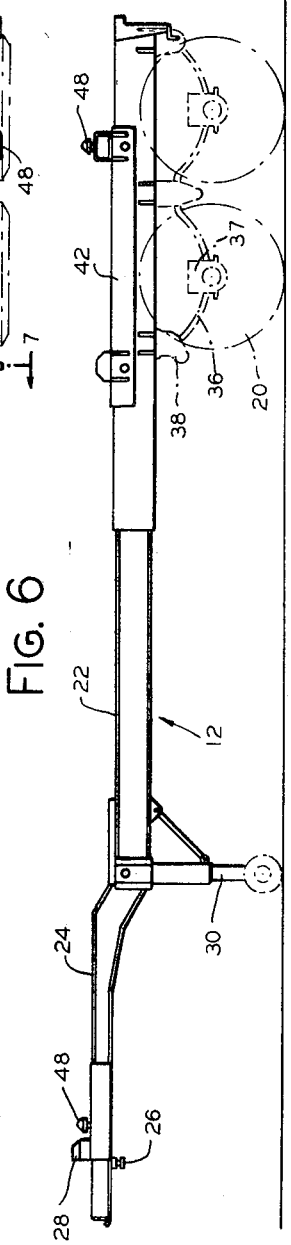
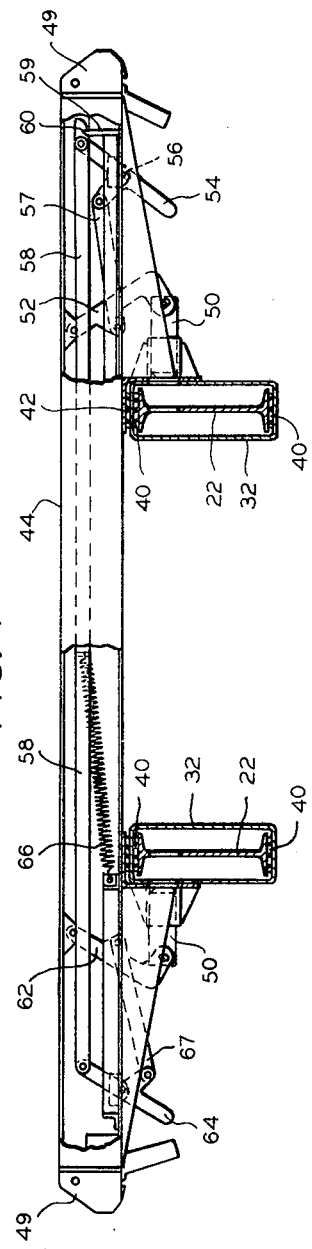
INVENTOR
ROBERT A. PRATT
BY
Kenneth C. Witt
ATTORNEY United States Patent Office 3,508,762
Patented Apr. 28, 1970

3,508,762
CONTAINER CHASSIS
Robert A. Pratt, Harbert, Mich., assignor to Clark
Equipment Company, a corporation of Michigan
Filed Mar. 22, 1968, Ser. No. 716,285
Int. Cl. B62d 27/06
U.S. Cl. 280—81                                     5 Claims

ABSTRACT OF THE DISCLOSURE

A container carrying wheeled chassis which is adjustable to accept different sizes of containers, and the length of which is adjustable to accommodate it to the laws of the various states, and which will permit three 24 ft. containers on three such chassis to be carried on a single 85 ft. piggyback railroad car.

Background of the invention

This invention relates to so-called container chassis which are frames with a wheeled undercarriage at the rear end and a fifth wheel connection member at the forward end. With a container or containers secured on such a chassis it can be connected to and pulled by a highway tractor in the same manner as a conventional semi-trailer, and it can also be loaded onto a railroad car and carried piggyback in the same manner as a conventional semi-trailer.

One of the problems in the use of containers in inter-modal transportation, that is, where a single container may be handled by ship, railroad and/or highway vehicles is that all of such containers are not the same size. This makes it necessary for the conveyance which will transport the container to be adaptable for more than one size. Another problem relating specifically to highway transportation is that many states have so-called bridging laws which require a certain minimum spacing between the front and rear wheels which support a load on the highway and impose other requirements which make it desirable to be able to adjust the location of the rear wheels of a semi-trailer or container chassis forwardly or rearwardly to the optimum location. It is the object of the present invention to provide a container chassis which is readily adjustable to accept different sizes of containers and on which the wheeled undercarriage is readily adjustable to various positions required to comply with the laws of the various states.

Summary of the invention

In carrying out my invention in one preferred form thereof I provide a container carrying chassis which includes an elongated frame, an undercarriage movable along the frame, a movable bolster on the frame for supporting a container, and latching means which permits the selective movement of either the undercarriage or the bolster. Thus the present container chassis can be adjusted to accept a different size of container or it can be adjusted to change the location of the undercarriage, or both.

Brief description of the drawing

In the drawing:
FIGURE 5 is a top plan view of a preferred embodiment of this container chassis,
FIGURE 6 is a side elevational view of the container chassis of FIG. 5,
and
FIGURE 7 is a sectional view along the line 7—7 of FIG. 5.

Description of the preferred embodiment

Figure 1:
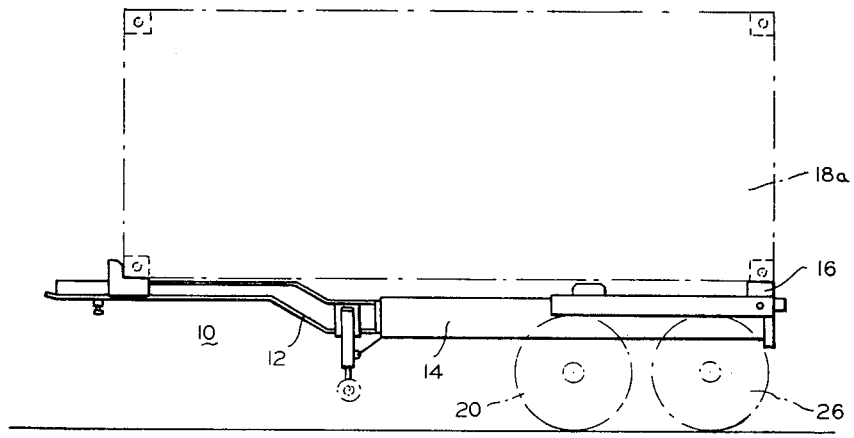
FIGURES 1 through 4 inclusive show schematically four different configurations to which the present container chassis is adjustable.

It will be recognized that all of the figures of the drawing are in part schematic, in order to permit an understanding of the invention without showing and describing unnecessary details. The preferred embodiment of the invention illustrated is shown as utilized with a 20 ft. container and a 24 ft. container, although it will be readily appreciated by those skilled in the art that it is equally applicable to other sizes of containers. The two containers as shown schematically are the USASI (United States of America Standards Institute) 20 ft. container which is 20 ft. long, 8 ft. high and 8 ft. wide, and the 24 ft. long container utilized by the Matson Navigation Company, which is 24 ft. long, 8½ ft. high and 8 ft. wide.

The numeral 10 on the drawing indicates generally the container chassis of the present invention, while the numeral 12 indicates generally an elongated frame, and more details in respect of the frame are given in connection with the subsequent description of FIGS. 5–7 of the drawing. The numeral 14 indicates generally an undercarriage which is movable on the frame 12 and more details concerning this undercarriage also are given subsequently. A bolster which is movable relative to the frame and the undercarriage is indicated generally by the numeral 16, and 20 and 24 ft. containers are indicated respectively by the identifying characters 18a and 18b.

Figure 2:
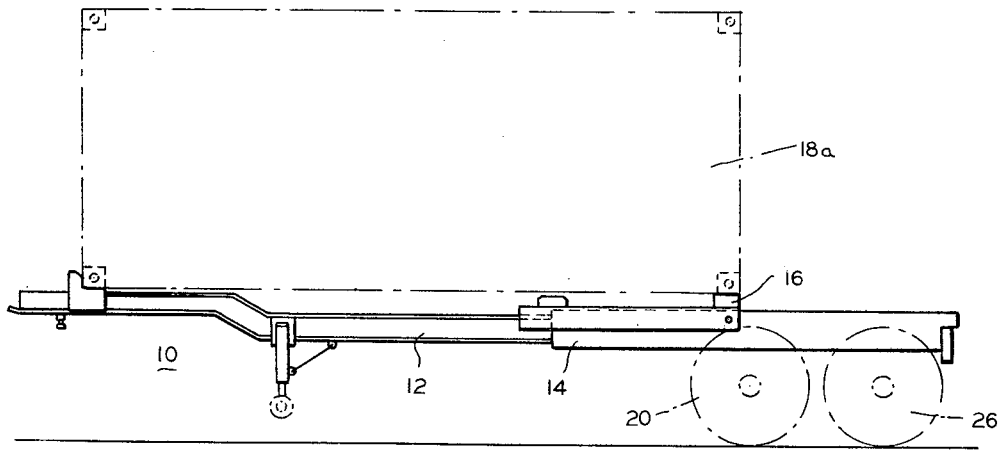
Figure 3:
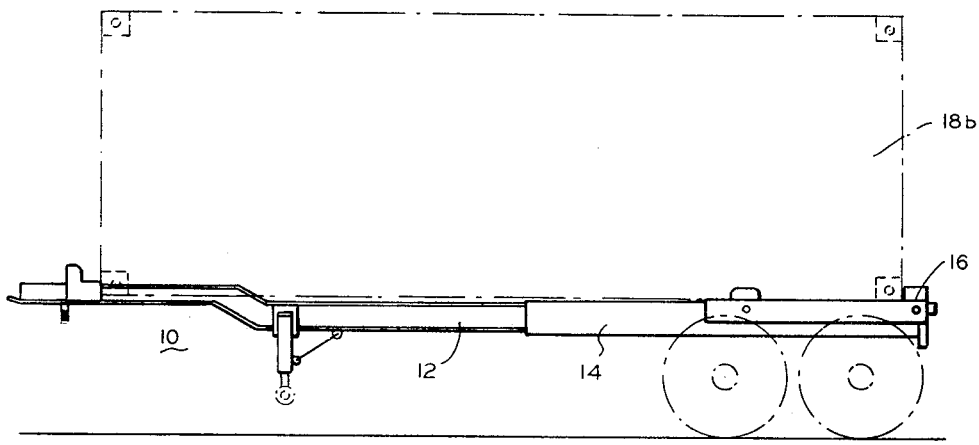
Figure 4:
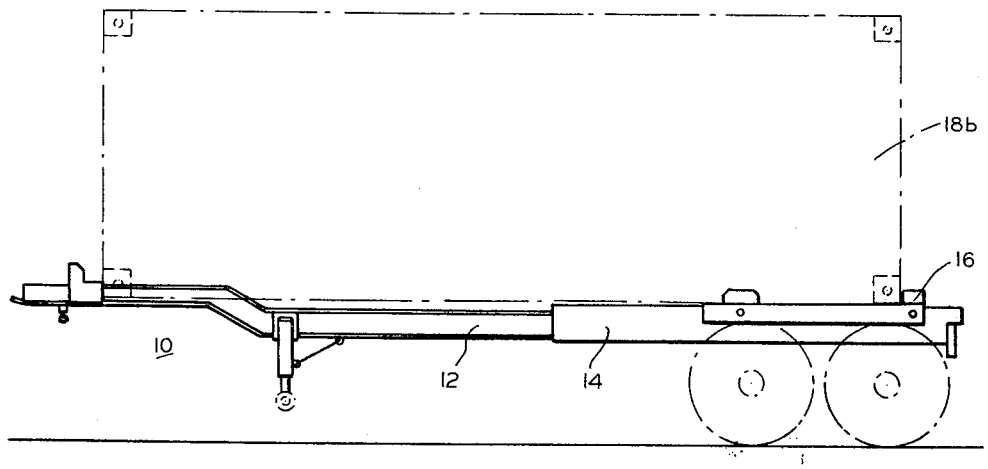

FIG. 1 shows the container chassis 10 carrying a 20 ft. container with the undercarriage moved forwardly so that the length of the container chassis is the minimum, and in this particular case it is a little less than 22 ft. FIG. 2 shows the container chassis 10 carrying the same container 18a but with the undercarriage extended so that the wheels 20 on the undercarriage are extended to a greater length from the front of the container chassis, and in this particular example the overall length is slightly more than 28 ft. It will be appreciated that the configuration of FIG. 1 is used when the container chassis is to be operated in cramped quarters or when it is to be loaded on a railroad car to be carried piggyback, whereas the configuration of FIG. 2 is utilized when the container chassis is to be pulled over the highway, the increased distance between the wheels 20 and the towing vehicle being required to comply with the laws of some of the states. FIG. 3 shows the container chassis 10 carrying a 24 ft. container 18b with the undercarriage retracted so that the container chassis is of minimum length for yard operation or for carrying piggyback on a railroad car, although it will be appreciated that the length of the configuration shown in FIG. 3 is greater than that of FIG. 1 because the bolster 16 has been moved rearwardly an amount sufficient to accommodate the longer container. The overall length of this configuration is slightly less than 26 ft. FIG. 4 shows the container chassis 10 carrying a 24 ft. container with the undercarriage extended for highway operation.

Referring to FIGS. 5, 6 and 7, the essential parts of the container chassis 10 are shown in greater detail. The elongated frame 12 includes a pair of main I-beam members which are indicated by the numeral 22. Connected to the front of the two main I-beam members is a forwardly projecting raised structure 24 which carries a downwardly projecting member 26 for connection to the fifth wheel coupling on the highway tractor. Portion 24 of the frame also supports a transversely extending fixed bolster 28 which supports the front end of the container. Likewise, the frame is equipped in the usual manner with a landing gear indicated generally by the numeral 30 which may be extended to support the front end of the container chassis when it is not connected to a vehicle or otherwise supported.

In the form described and illustrated herein, the undercarriage comprises a pair of elongated hollow members 32 of generally rectangular configuration (see FIG. 7) through which the main I-beam members 22 project. As best seen in FIG. 6, the members 32 are interconnected by cross-brace members 34 to provide a rigid structure and suitable wheels 20 and the necessary springs 36, axles 37, brackets 38 and other necessary parts to form a complete running gear are connected to the structure 32, 34. The members 32 may be provided internally with suitable wear pads or rollers 40, indicated in FIG. 7, in a known manner.

The movable bolster 16 includes a pair of longitudinal structural members 42 which overlie longitudinal members 32 of the undercarriage and are movable longitudinally with respect thereto. In the form illustrated, the movable bolster also includes a transverse structure indicated generally by the numeral 44 toward the front of the movable bolster, and another transverse structure 46 near the rear of the movable bolster, both of such transverse structures being secured to longitudinal members 42 and forming an integral part of the movable bolster 16. As shown, a 20 ft. container rests on bolster 28 at the front end and on the upper surface of portion 46 of the rear bolster, and are secured thereto by means of twist type latch mechanisms which project through openings in the bottoms of the container adjacent the four corners thereof, in a known manner. The male portions of these twist latching mechanisms are indicated by the numeral 48 on the drawing. The 24 ft. container 18b for which the particular container chassis described and illustrated is intended is supported at a lower level, as illustrated in FIGS. 3 and 4, because it has a longitudinally extending well or recess at the front to accommodate the portion 24 of the frame, and also a transverse well or recess about 5 ft. from the back end of the container to receive transverse structure 44. The container 18b is secured in front by the same twist lock mechanisms 48, but at the rear it is secured by latch members 49 (see FIG. 7) which engage suitable cam surfaces along the sides of the container beneath the floor thereof.

There is shown in FIG. 7 a latching mechanism which may be utilized to latch both the movable bolster and the undercarriage to the frame. The latching mechanism is shown in FIG. 7 in the unlatched position, and latching is accomplished by operating the mechanism to move pins 50 inwardly to project through aligned openings in telescopically arrange members 42, 32 and 22. Referring to the right side of FIG. 7, the pin 50 is suspended by means of a link 52 from the top surface of cross member 44. The pin 50 is moved to the unlatched position as shown by moving the three-arm lever 54 clockwise about a pivot point 56 which by means of a link 57 pulls the lever 52 to the right and the pin 50 is then held in the open position by means of a link 58 which hooks over a structural member 59 as indicated at 60. To release the latch mechanism, that is, to cause it to go into the latching position, it is necessary only to strike the lower portion of lever 54 a slight blow with the hand which, through a lost motion connection at 56 causes the link 58 to raise to break the connection at 60, and the whole mechanism then goes into the latching position. It will be appreciated that there is a three-arm lever 64 on the left side, similar to member 54 on the right side, a link 67 on the left side corresponding to link 57 on the right side and a link 62 on the left side corresponding to link 52 on the right side, and that these members are operable through link 58 to move the left pin 50 inwardly to the latching position simultaneously with the inward movement of pin 50 on the other side. This mechanism is basically gravity operated; however, a spring 66 may be attached as shown to link 58 to assure the full and proper closing of the latching mechanism. It will be appreciated that various air operated, electrically operated and other latching mechanism are available which could be utilized if desired.

As illustrated, holes are provided in members 42 for latching the bolster in two positions and holes are provided in members 34 for latching the undercarriage in three positions, with corresponding holes being provided in the main frame members 22. However, as many positions can be provided as are required. The two positions of the bolster are illustrated in FIGS. 1 and 2 which show the first position, and FIGS. 3 and 4 which show the second position of the bolster. The undercarriage has a first position as shown in FIG. 1, a second position which in FIG. 3 and a third position which is shown in FIGS. 2 and 4.

When the latching mechanism is unlatched, the undercarriage can be moved between the three positions in a known manner by setting the brakes on the wheels of the undercarriage, for example, by utilizing the air brake system of the highway tractor to which the container chassis is coupled, after which the said tractor is driven forwardly or rearwardly as the case may be to telescope the frame 12 into or out of undercarriage 14 to reach the desired position. When the latching mechanism is unlatched, the bolster likewise may be moved from one position to another to adjust it for the container which is to be placed on the container chassis, and such movement may be accomplished manually. However, the movement of the bolster from one position to another also can be accomplished by moving the undercarriage because the bolster in effect is secured to the undercarriage, by friction, when the latching mechanism is unlatched. Therefore, movement of the undercarriage will also move the bolster when there is no container resting on the bolster to hold it in position. It will be understood of course that if desired a separate latch or positive connection could be provided to secure the bolster to the undercarriage in order to carry out this method of moving the bolster although this is not ordinarily required. When the both container bolster and the undercarriage are in the correct position the latching mechanism or mechanisms are then relatched, and the container chassis is ready for use.

While I have described and illustrated herein a preferred embodiment of my invention, it will be understood that modifications may be made.

I claim:

1. A container chassis comprising an elongated frame, an undercarriage movable longitudinally on the said frame, a bolster supported by the said frame and movable longitudinally relative thereto, for supporting a container, and common latching means permitting the selective movement of either the said undercarriage or the said bolster.

2. A container chassis as specified in claim 1 in which the said bolster is located adjacent one end of the said frame for supporting one end of the container, and a second bolster is provided adjacent the other end of the said frame for supporting the other end of the container.

3. A container chassis as specified in claim 1 in which the said bolster rests on the said undercarriage and is movable therealong.

4. An extendible chassis comprising an elongated main frame, an undercarriage movably mounted on the said frame, a bolster movably mounted on the said undercarriage, and a releasable latch mechanism latching both the said undercarriage and the said bolster to the frame.

5. An extendible chassis as specified in claim 4 in which the said movable bolster is located adjacent one end of the said main frame and is arranged to support one end of a container and an additional bolster is provided adjacent the other end of the frame for supporting the other end of the container.

References Cited

UNITED STATES PATENTS

| | | |
|---|---|---|
| 2,174,063 | 9/1939 | Richards. |
| 3,237,967 | 3/1966 | Anderson _____ 280—81 |
| 3,239,274 | 3/1966 | Weiss _____ 280—81 X |
| 3,259,400 | 7/1966 | Tantlinger et al. _____ 280—81 X |
| 3,374,010 | 3/1968 | Crockett et al. _____ 280—81 X |

KENNETH H. BETTS, Primary Examiner

U.S. Cl. X.R.

280—34, 405